United States Patent [19]
Sasaki

[11] 3,864,714
[45] Feb. 4, 1975

[54] LENS STOP-DOWN MECHANISM
[75] Inventor: Saburo Sasaki, Tokyo, Japan
[73] Assignee: Kabushiki Kaisha Ricoh, Tokyo, Japan
[22] Filed: Mar. 18, 1974
[21] Appl. No.: 451,822

[30] Foreign Application Priority Data
Apr. 2, 1973 Japan.................... 48-37705

[52] U.S. Cl. ................................ 354/272
[51] Int. Cl. .............................. G03b 9/07
[58] Field of Search ........... 354/270, 272, 274, 252

[56] References Cited
UNITED STATES PATENTS
| | | | |
|---|---|---|---|
| 2,845,013 | 7/1958 | Schutz .......................... | 354/272 |
| 3,687,047 | 8/1972 | Ito................................. | 354/274 |
| 3,715,965 | 2/1973 | Alfredsson.................... | 354/274 |

Primary Examiner—Joseph F. Peters, Jr.
Attorney, Agent, or Firm—Frank J. Jordan

[57] ABSTRACT

The diaphragm is stopped-down from maximum opening to the desired opening when the shutter release is depressed. Rebound of the diaphragm blades as the stop-down operation ends which would cause overexposure is prevented by a novel arrangement of an inertial mass which is set into motion when the shutter release is depressed and strikes a linkage member of the diaphragm just as the blades start to rebound to cancel the rebound force of the blades.

13 Claims, 4 Drawing Figures

LENS STOP-DOWN MECHANISM

The present invention relates to a lens stop-down mechanism especially suitable for a single-lens reflex camera incorporating a novel inertial mass arrangement to prevent rebound of the diaphragm blades as the stop-down operation ends which would cause overexposure.

Single-lens reflex cameras are highly appreciated in the art for their convenient optical systems which allow a single lens to be used for both exposing the film and viewing the scene to be photographed. In order to further increase the performance of these cameras, they are provided with lens stop-down mechanisms which allow viewing of the scene to be photographed with the diaphragm wide open. Depression of the shutter release actuates the lens stop-down mechanism to automatically stop the diaphragm down to the desired setting for exposing the film. When the diaphragm blades reach their stopped-down position, a mechanical member of the diaphragm abuts with a stopper member to prevent further stopping-down of the diaphragm. However, a problem exists in the prior art in that the mechanical member rebounds off the stopper member with the result that the diaphragm is momentarily partially reopened, and the film is overexposed. As a prior art attempt to overcome the effects of this adverse phenomenon, cameras have been designed so that the shutter is not opened until the lens has been stopped-down and the rebound of the diaphragm blades has ended. However, this method has proven unsatisfactory in that a significant delay is introduced into the shutter operation which makes it difficult to synchronize the actual opening of the shutter with the event which is desired to be photographed, especially if objects to be photographed are moving at high rates of speed such as during athletic events.

It is therefore an object of the present invention to provide an improved lens stop-down mechanism especially suited for a single-lens reflex camera by which rebound of the diaphragm blades upon stop-down is inhibited.

It is a further object of the present invention to provide as a useful subcombination of a lens stop-down mechanism as described above a novel inertial mass arrangement to prevent rebound of diaphragm blades upon stop-down which is applicable to known lens stop-down mechanisms.

It is a still further object of the present invention to provide a novel and useful lens stop-down mechanism in which a delay to compensate for rebound of diaphram blades stop-down is not introduced.

The above and other objects, features and advantages of the present invention will become clear from the following detailed description taken in conjunction with the accompanying drawings in which directions such as "upper," "clockwise" etc. refer to those as viewed in the respective drawings and in which.

Figure 1:
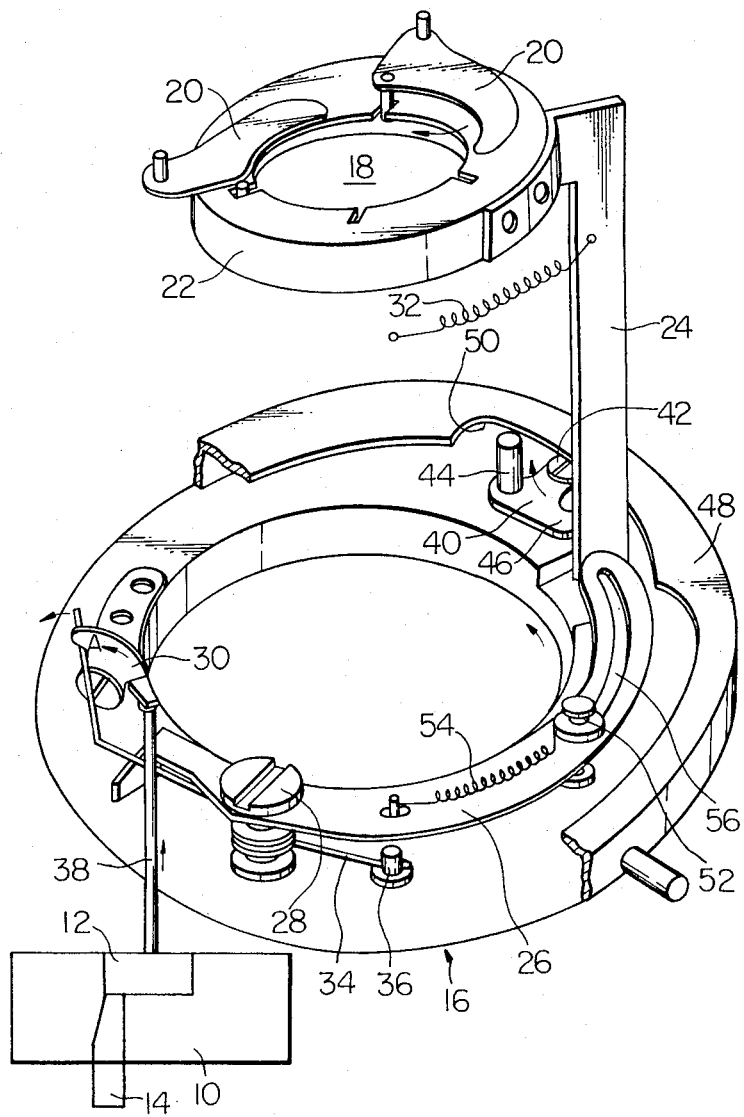
FIG. 1 is a schematic view of a camera combined with a perspective view of a lens stop-down mechanism embodying the invention incorporated with the camera.
Figure 2:
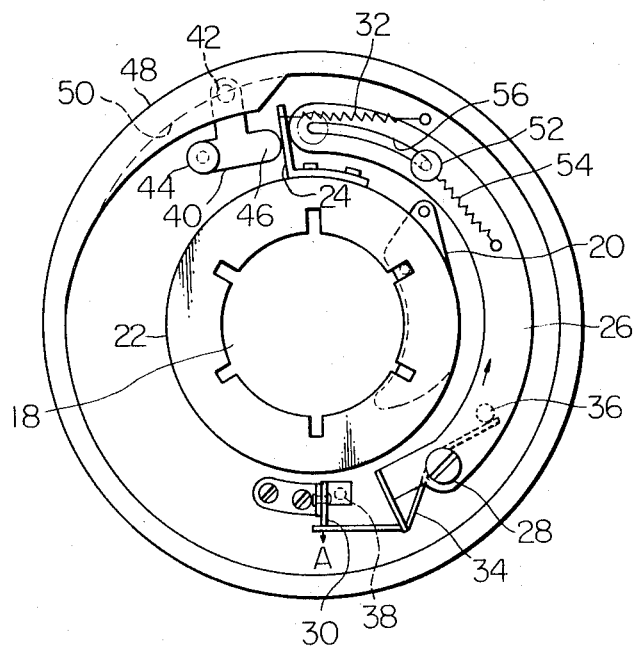
FIG. 2 is front sectional view of a lens incorporating the lens stop-down mechanism of FIG. 1.

Referring now to FIGS. 1 and 2, a camera 10 which is preferably of the single-lens reflex type, includes a shutter mechanism 12 and a shutter release member or button 14. An interchangeable lens 16 for the camera 10 includes adjustable aperature means in the form of a diaphragm 18 having at least one blade 20 to vary the diameter of the diaphragm 18 and the amount of light being transmitted through the lens 16. As best seen in FIG. 1, the diaphragm 18 includes a diaphragm ring 22, which when rotated moves the blades 20 to vary the diaphragm 18 opening. A diaphragm lever 24, which extends parallel to the optical axis of the lens 16, has one end fixed to the diaphragm ring 22 and the other end engageable with one end of actuating means including a generally arcuate actuating lever 26. The actuating lever 26 is pivotally mounted on a bolt 28 at an intermediate point thereof, and its other end is engageable with the shutter mechanism 12 through a linkage including a bell-crank engaging lever 30. The diaphragm 18 is urged by a spring 32 connected to the diaphragm lever 24 toward a maximum or wide-open position, and the actuating lever 26 is urged by a spring 34 away from engagement with the diaphragm lever 24. The actuating lever 26 is urged clockwise by the spring 34 as viewed in FIG. 2. One end of the spring 34 abuts with a pin 36, and the other end is engageable with the engaging lever 30. A shaft 38 is provided to connect the shutter mechanism 12 to the engaging lever 30.

As best seen in FIG. 2, stopper means include a T-shaped lever 40 which is pivotal about a pin 42. A cam follower 44 is carried on one arm of the lever 40, and the end 46 of the other arm of the lever 40 is engageable with the other side of the diaphragm lever 24. A diaphragm setting ring 48 is manually rotatable to select the setting of the diaphragm 18, and is formed with an internal cam surface 50 which is engageable with the cam follower 44.

A novel inertial mass means including an inertial mass 52 and a spring 54 to prevent rebound of the diaphragm blades 20 will be described more fully below. The inertial mass 52 is slidable within the extent of a generally arcuate slot 56 formed through the actuating lever 26 and is biased toward the position shown in FIG. 1 by the spring 54, which has relatively low stiffness.

The operation of the lens stop-down mechanism will now be described with reference to FIG. 2. Further clarity of understanding may be obtained, if desired, by means of simultaneous reference to FIG. 1, in which the directions recited with reference to FIG. 2 are shown by arrows.

The actuating lever 26 is normally biased clockwise by the spring 34 away from engagement with the diaphragm lever 24, which is biased by the spring 32 clockwise so that the diaphragm blades 20 are moved to a maximum counterclockwise position at which the diaphragm 18 is fully open. Depression of the shutter release button 14 causes the shutter mechanism 12 to move the shaft 38 upward normal to the sheet as viewed in FIG. 2. This causes the engaging lever 30 to rotate in the direction of an arrow A. The left end of the spring 34 and thereby the actuating lever 26 subsequently rotate counterclockwise. This causes the top left end of the actuating lever 26 to abut with the right side of the diaphragm lever 24 and thereby rotate the diaphragm lever 24 and the diaphragm ring 22 counterclockwise. This causes the blades 20 to rotate clockwise to stop-down the diaphragm 18 to the desired setting. The left side of the diaphragm lever 24 will then abut with the T-shaped lever 40 and rotate the lever 40 clockwise. When the cam follower 44 abuts with the cam surface 50 of the diaphragm setting ring 48, motion of the parts thus far described will stop and the diaphragm 18 will be stopped-down to the desired setting. The diaphragm setting ring 48 may be provided with calibrations indicative of the ratio of the effective diameter of the diaphragm 18 to the focal length of the lens 16 (f-stops), although not shown, to facilitate manual setting of the diaphragm setting ring 48 in conjunction with the cam surface 50.

Figure 4:
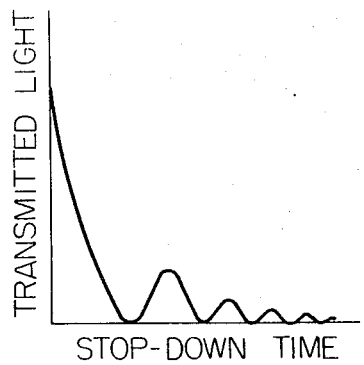
FIG. 4 is similar to FIG. 3 but relates to a lens incorporating a prior art lens stop-down mechanism.

If the inertial mass 52 were not provided, the diaphragm 18 opening or the amount of light transmitted through the lens 16 would vary as shown in FIG. 4 as a function of time after the stop-down operation is begun. As shown, a series of oscillations of significant magnitude occur, which cause overexposure of the film in the camera 10. This is because the left side of the diaphragm lever 24 rebounds off the end 46 of the T-shaped lever 40, and the diaphragm ring 22 is momentarily moved clockwise and the diaphragm 18 is partially opened. This rebounding occurs several times to produce the oscillations shown.

Figure 3:
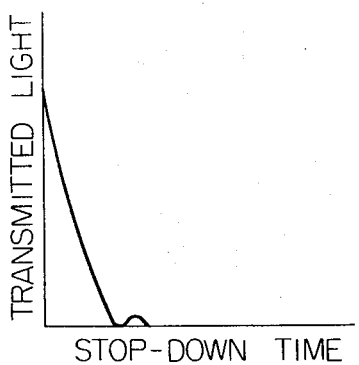
FIG. 3 is a graph of the light transmission as a function of time through the lens of FIG. 2.

Such rebounding is prevented by the inertial mass 52. As the actuating lever 26 is rotated counterclockwise, the inertial mass 52 is accelerated by centrifugal force to move from a first position shown in solid line (toward which it is biased by the spring 54) to a second position shown in phantom. The timing is such that the inertial mass 52 abuts with the upper end of the slot 56 just at the time when the diaphragm lever 24 starts to rebound off the end 46 of the T-shaped lever 40 or slightly afterwards. During the abrupt deceleration of the inertial mass 52 caused by abutment thereof with the end of the slot 56, the kinetic energy of the inertial mass 52 is transferred to the diaghrahm lever 24 to cancel the rebound force and inhibit rebounding of the diaphragm lever 24 to the extent shown in FIG. 3, which has been experimentally found to be negligible. In this manner, proper exposure of the film is obtained without introducing a time lag into the shutter system. After the inertial mass 52 abuts with the end of the slot 56, it will be returned to the first position by the spring 54.

From the above description and attached drawings, the novelty and usefullness of a lens stop-down mechanism according to the invention will be readily apparent.

What is claimed is:

1. A stop-down mechanism for a lens having adjustable aperture means urged by biasing means toward a maximum open position, comprising:
   stopper means being manually adjustable to engage with the aperture means and limit movement thereof away from the maximum open position to a position corresponding to the desired aperture setting;
   actuating means arranged to move the aperture means from the maximum open position to the position corresponding to the desired aperture setting when manually actuated; and
   inertial mass means arranged to be accelerated by movement of said actuating means and transfer kinetic energy to the aperture means in substantial simultaneity with the engagement thereof with said stopper means in a direction to cancel the force of rebound of the aperture means from the stopper means.

2. A stop-down mechanism according to claim 1, in which said inertial mass means comprises an inertial mass movable from a first to a second position when accelerated by movement of said actuating means, and biasing means to urge said inertial mass toward the first position.

3. A stop-down mechanism according to claim 2, in which said actuating means comprises:
   a generally arcuate lever having an intermediate pivot point with one end thereof being engageable with the aperture means and the other end being manually actuable; and
   biasing means urging said arcuate lever away from engagement with the aperture means;
   said actuating lever having a generally arcuate slot formed therethrough with said inertial mass being arranged to slide within the slot;
   the first position being the end of the slot farthest from the aperture means and the second position being the end of the slot closest to the aperture means, said biasing means of said inertial mass means being carried on said actuating lever.

4. A stop-down mechanism according to claim 3, in which the aperture means includes a diaphragm of variable diameter, a diaphragm ring arranged to vary the diameter of the diaphragm when rotated, and a diaphragm lever having one end fixed to the diaphragm ring and the other end engageable with said one end of said actuating lever so that the diaphragm ring is rotated in a direction to stop-down the lens when said actuating lever is manually actuated.

5. A stop-down mechanism according to claim 4, in which the lens is for a camera.

6. A stop-down mechanism according to claim 5, in which the camera is a single-lens reflex camera.

7. a stop-down mechanism according to claim 6, in which the lens is an interchangeable lens.

8. A stop-down mechanism according to claim 6, in which said actuating lever is connected through a linkage to a shutter mechanism of the camera, whereby said actuating lever is actuated to stop-down the lens when the shutter release member of the shutter mechanism is manually actuated.

9. In a stop-down mechanism for a lens having adjustable aperture means urged by biasing means toward a maximum open position, stopper means being manually adjustable to engage with the aperture means and limit movement therof away from the maximum open position to a position corresponding to the desired aperture setting, and actuating means arranged to move the aperture means from the maximum open position to the position corresponding to the desired aperture setting when manually actuated, the improvement comprising:
   an inertial mass arranged to be accelerated from a first position by movement of the actuating means to a second position to transfer kinetic energy to the aperture means in a direction to cancel the force of rebound of the aperture means from the stopper means; and
   a biasing member to urge said inertial mass toward the first position.

10. A stop-down mechanism according to claim 9, in which the actuating means includes a generally arcuate lever having an intermediate pivot point with one end thereof being engageable with the aperture means and the other end being manually actuable, and biasing means urging the actuating lever away from engagement with the aperture means; and in which the actuating lever is formed with a generally arcuate slot, said inertial mass being arranged to slide within the slot; whereby the first position is the end of the slot farthest from the aperture means and the second position is the end of the slot closest to the aperture means, said biasing member being carried on the actuating lever.

11. A stop-down mechanism according to claim 10, in which the lens is for a single lens reflex camera.

12. A stop-down mechanism according to claim 11, in which the aperture means includes a diaphragm of variable diameter, a diaphragm ring arranged to vary the diameter of the diaphragm when rotated, and a diaphragm lever having one end fixed to the diaphragm ring and the other end engageable with the one end of the actuating lever so that the diaphragm ring is rotated in a direction to stop-down the lens when the actuating lever is manually actuated.

13. A stop-down mechanism according to claim 12, in which the actuating lever is connected through a linkage to a shutter mechanism of the camera, whereby the actuating lever is actuated to stop-down the lens when the shutter release member of the shutter mechanism is manually actuated.

* * * * *